J. M. ROSEBROOK.
Pawl and Ratchet-Gears.

No. 147,176. Patented Feb. 3, 1874.

Witnesses.
Harry King
Alex Mahon

Inventor.
Jno. M. Rosebrook
by A. M. Smith
Attorney

UNITED STATES PATENT OFFICE.

JOHN M. ROSEBROOK, OF HOOSICK FALLS, NEW YORK, ASSIGNOR TO WALTER A. WOOD MOWING AND REAPING MACHINE COMPANY, OF SAME PLACE.

IMPROVEMENT IN PAWL-AND-RATCHET GEARS.

Specification forming part of Letters Patent No. 147,176, dated February 3, 1874; application filed July 19, 1873.

*To all whom it may concern:*

Be it known that I, JOHN MILTON ROSEBROOK, of Hoosick Falls, county of Rensselaer, State of New York, have invented certain new and useful Improvements in Pawl-and-Ratchet Gear, of which the following is a full, clear, and exact description, reference being had to the accompanying drawing making part of this specification, in which—

Figure 1:
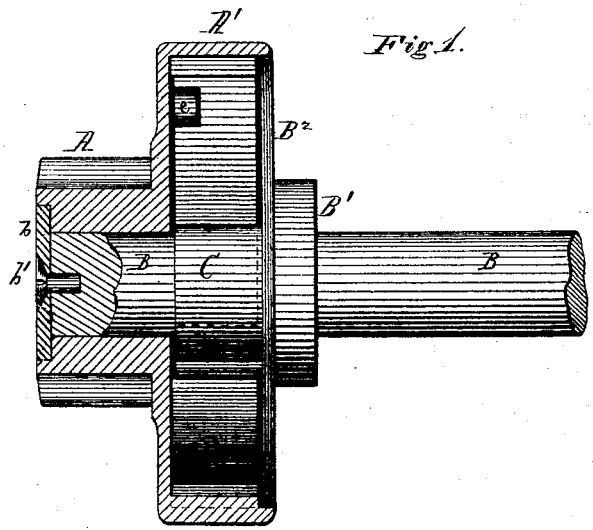
Figure 2:
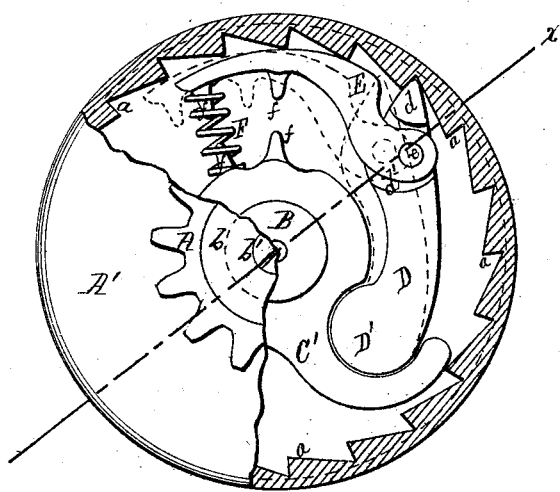

Figure 1 represents the ratchet-case and spur-pinion in section, taken in the line $x$ $x$, Fig. 2, with the pawl in elevation; and Fig. 2 is an end or face view, with the pinion and casing broken away in part for showing the pawl-and-ratchet arrangement.

Similar letters of reference denote corresponding parts in both figures.

The invention relates to a novel construction of pawl-and-ratchet gearing more particularly intended for use as a "backing" ratchet arrangement for harvesting-machines, but applicable elsewhere wherever this class of pawl-and-ratchet gearing is used.

In the accompanying drawings, A represents a pinion, cast with, or rigidly connected to, an enlarged cylindrical case or box, $A^1$, which is provided on its inner face with a series of ratchet-teeth, $a$. This pinion, with the casing, is mounted loosely on the end of a shaft, B, being held in place thereon by a washer, $b$, countersunk in the face or end of the pinion, and a screw, $b'$, as shown, or by any of the usual devices for securing the pinion on the shaft, such as will permit its free rotation thereon without turning the shaft. The shaft B is provided with a collar or hub, $B^1$, against which a disk, $B^2$, on the shaft B, abuts, said disk serving to cover the open end of the cylindrical case $A^1$, and inclosing the pawl and ratchet, and between said disk $B^2$ and the pinion A; and within the case $A^1$, the shaft B is armed with a hub, C, which, together with the disk $B^2$, may either be cast in one piece with the axle B and hub $B^1$, or separately, and keyed or otherwise rigidly secured to said axle in any usual or preferred manner. The hub C is cast with an eccentric projection, $C'$, in one side of which a socket or recess is formed to receive and retain the inner pivoted end of the pawl D, said pawl being provided on its inner end with an enlarged head or bulb, $D'$, which fits the socket in projection $C'$ and forms the pivot on which said pawl vibrates. The outer end $d$ of the pawl D is adapted to engage with the ratchet-teeth $a$, and at or near such outer end the pawl is notched or cut away at $d'$, and is provided in the recess or notch thus formed with a pin or pivot, $e$, upon which a friction plate, or arm, or lever, E, is pivoted, as shown in Fig. 2, the outer or free end of said plate or arm E resting upon one end or arm of a spring, F, which, at its opposite end or arm, is secured to the hub C—a series of spurs, $f$ $f$, two or more, formed on the hub C, and also on arm E, serving as a convenient device for retaining the spiral form of spring shown in position, and also permitting a change of its position for adjusting the tension or pressure of the arm E. The form of the spring used may, however, be varied, if desired. The outer face of the arm or plate E is curved to conform to the circle of the ratchet-teeth $a$, with its free end drawn in slightly to prevent it from becoming engaged with said teeth, and is held by the spring F out in frictional contact with said teeth as the latter are rotated with the pinion A.

By the arrangement shown and described, it will be seen that the pawl is caused to engage with or withdraw from the ratchet-teeth by the frictional contact of its actuating arm with such ratchet-teeth, thus causing the ratchet and pawl to assume the position shown in full lines, Fig. 2, in the forward or operative movement of the machine or pinion, and causing the pawl to be withdrawn, and to assume the position shown in dotted lines when the machine or pinion is backed, thereby permitting the shaft B to remain stationary.

This construction dispenses with the direct action of the spring upon the pawl, which makes the withdrawal of the pawl over each tooth necessary when backing, and, consequently, obviates the disagreeable clicking noise attendant upon the use of the backing-ratchets heretofore in common use in harvesting-machines.

It will be obvious that the relation of the ratchet and pawl to the inclosing rim and hub C and to the pinion and shaft may be reversed without departing from my invention.

Having thus described my invention, what I claim as new, and desire to secure by Letters Patent, is—

The combination, with the pawl, of the pivoted yielding friction plate or arm E, for causing said pawl to engage with, or to be disengaged from, the ratchet, substantially as described.

JOHN M. ROSEBROOK.

Witnesses:
   J. RUSSELL PARSONS,
   A. C. EDDY.